United States Patent [19]

Dotson

[11] Patent Number: 5,058,925
[45] Date of Patent: Oct. 22, 1991

[54] LEACH RESISTANT INK FOR PROTECTING DOCUMENTS FROM ALTERATION AND DOCUMENT PROTECTED THEREBY

[75] Inventor: Mark Dotson, Dayton, Ohio

[73] Assignee: The Standard Register Company, Dayton, Ohio

[21] Appl. No.: 450,214

[22] Filed: Dec. 13, 1989

[51] Int. Cl.$^5$ .................... B42D 15/00; C09D 11/00; B44F 1/12
[52] U.S. Cl. ........................ 283/95; 106/21; 106/25; 106/162; 428/29; 428/916; 162/140
[58] Field of Search .......................... 106/21, 25, 162; 428/29, 916; 283/95; 162/140

[56] References Cited

U.S. PATENT DOCUMENTS

| | | | |
|---|---|---|---|
| 3,886,083 | 5/1975 | Laxer | 106/21 |
| 4,156,776 | 5/1979 | Mufti et al. | 106/25 |
| 4,618,402 | 10/1986 | Camus | 162/140 |

*Primary Examiner*—William R. Dixon, Jr.
*Assistant Examiner*—Helene Klemanski
*Attorney, Agent, or Firm*—Killworth, Gottman, Hagan & Schaeff

[57] ABSTRACT

An initially colorless, chemically sensitive protective ink which can be readily printed or applied onto a document substrate and which reacts upon contact with an oxidizing agent to form a noticeable color change is provided. The protective ink, when printed onto a document, resists leaching by water for an extended period of time, both before and after contact with oxidizing agents, and provides visible evidence of any attempted tampering. The leach-resistant ink includes a colorless material which becomes colored upon contact with an oxidizing agent and a complexing agent which reacts to form a complex with the colorless material. A fixing agent which promotes insolubilization and fixing of the complex to the document substrate is also provided.

8 Claims, No Drawings

5,058,925

LEACH RESISTANT INK FOR PROTECTING DOCUMENTS FROM ALTERATION AND DOCUMENT PROTECTED THEREBY

BACKGROUND OF THE INVENTION

This invention relates to a protective, initially colorless ink for use on a document to protect it against alteration, and more particularly to a leach-resistant chemically sensitive ink which develops color on contact with oxidizing agents and a document printed therewith.

Safety paper is commonly used for making checks, money orders, negotiable certificates, and other documents of value or indicating value and which require protection against alteration or forgery. The safety paper typically has printed thereon chemically reactive inks which are colorless, but which develop color and reveal words such as "VOID" to show that an attempt has been made to alter the document when contacted with common oxidizing agents such as ink eradicators.

Remick, U.S. Pat. No. 1,839,995, describes such a safety paper which has been treated with an ink containing a guanidine substance which reacts with ink eradicators to cause a conspicuous color change on the paper.

Smith, U.S. Pat. No. 1,911,774, also relates to a safety paper which has been treated with an ink containing a combination of diphenol and diphenyl guanidine which produces a noticeable color change upon reaction with either an acidic or basic ink eradicator.

Currently, diphenyl guanidine and certain thiozol derivatives are used as protective inks for safety paper because they are nontoxic and relatively inexpensive. However, a major shortcoming of current safety papers is that they may be soaked in water and the protective inks leached free within a relatively short period of time (i.e., 30 minutes or less), rendering the security feature of the ink virtually ineffective against experienced forgers.

Accordingly, a need still exists in the art for a chemically sensitive protective ink which develops color on contact with an oxidizing agent and is also leach resistant once printed onto a document substrate over an extended period of time.

SUMMARY OF THE INVENTION

The present invention meets that need by Providing an initially colorless, chemically sensitive protective ink which can be readily printed or applied onto a document substrate and which reacts upon contact with an oxidizing agent to form a noticeable color change. Further, the protective ink of the present invention resists leaching by water for an extended period of time, both before and after contact with oxidizing agents. The present invention also provides a document which is protected against alteration by oxidizing agents.

In accordance with one aspect of the present invention, a leach-resistant ink for protecting documents from alteration by oxidizing agents is provided and includes a colorless material which becomes colored upon contact with an oxidizing agent and a complexing agent which reacts to form a complex with the colorless material. In a preferred embodiment of the invention, the colorless material is diphenyl guanidine and the complexing agent is selected from the group consisting of glucose, sucrose, sorbitol, methyl glucoside, and mixtures thereof.

The present invention also provides a document protected against alteration by oxidizing agents which includes a document substrate and a leach-resistant ink printed thereon, the ink comprising a colorless material which becomes colored upon contact with an oxidizing agent, a complexing agent which forms a complex with the colorless material, and a fixing agent which promotes insolubilization and fixing of the complex to the document substrate. In a preferred embodiment of the invention, the colorless material is diphenyl guanidine, and the complexing agent is selected from the group consisting of glucose, sucrose, sorbitol, methyl glucoside, and mixtures thereof. The fixing agent is preferably a mixture of condensation products from aryloxysulfonic acid derivatives, and the document substrate is cellulosic in nature.

The ink may be printed in the form of tamper-indicating indicia by conventional printing means such as gravure or flexographic printing. Once dry, the ink remains colorless until exposed to oxidizing agents such as common ink eradicators. Exposure to an oxidizing agent causes a reaction with the colorless ink to produce a conspicuous color change and appearance of the tamper-indicating indicia such as "VOID", evidencing the alteration attempt.

Through the use of a complexing agent to form a complex with the colorless, oxidizable material and a fixing agent to promote insolubilization and affixation to the document substrate, a leach resistant, tamper indicating mechanism is provided. Documents printed with the ink of the present invention may be soaked in water for periods in excess of two hours without any substantial leaching of the ink from the document. This resistance to leaching has been found to be effective both before and after exposure to oxidizing agents such as sodium hypochlorite.

Accordingly, it is an object of the present invention to provide a protective colorless ink for use on a document to protect it against alteration by oxidizing agents, and further to provide such a document and ink which are resistant to water leaching for an extended period of time. These, and other objects and advantages of the present invention, will become apparent from the following detailed description and the appended claims.

DETAILED DESCRIPTION OF THE PREFERRED EMBODIMENT

The composition of the present invention provides an initially colorless ink which can be readily applied to document substrates such as paper or other cellulosic materials. The colorless ink is preferably printed in a pattern which contains a hidden message such as "VOID" which becomes visible when the document is contacted by an oxidizing agent. Such oxidizing agents such as sodium hypochlorite and other ink eradicators are used by forgers to remove or alter information printed or written on the document. The presence of the hidden message makes apparent any attempts to alter the document.

The ink is produced by reacting a colorless material such as diphenyl guanidine with a complexing agent which forms a complex with the colorless material. Diphenyl guanidine is commercially available from Mobay Corporation under the trademark Chlorostain BR. Suitable complexing agents include saccharide compounds such as glucose, sucrose, sorbitol, methyl glucoside, and mixtures thereof. A preferred complexing agent for diphenyl guanidine is methyl glucoside which is commercially available from Horizon Chemical Company under the trademark Stameg 104. While not wishing to be bound by any particular theory, it is believed that the hydroxyl groups on the complexing agent form hydrogen bonds with the hydrogen atoms on the diphenyl guanidine.

The protective ink composition may be dispersed in a suitable liquid carrier for printing such as water and/or an alcohol. The composition may be printed onto a document substrate by any suitable means including gravure or flexographic printing. A preferred method of printing includes printing a hidden message such as "VOID" onto the document so that a conspicuous notice of any alteration attempt will be seen.

The protected document also includes a fixing agent thereon which promotes the insolubilization and affixation of the complex of colorless material to the document substrate. The fixing agent is preferably a mixture of condensation products from aryloxysulfonic acid derivatives which has been found to be particularly effective on cellulosic substrates. Such a fixing agent is commercially available from Mobay Corporation under the trademark Mesitol NBS. Again, the fixing agent may be dispersed in a suitable vehicle such as water and/or alcohol and applied to the document substrate.

The order of application of the protective ink and fixing agent is not critical; either may be applied first. However, it is preferred that the ink composition be printed onto the document substrate first. The fixing agent is then overcoated onto the document and dried.

The resulting protected document resists leaching of the protective ink for extended periods of time, both before and after exposure to oxidizing agents. Thus, any attempts to leach the protective ink from paper documents by extended soaking will result in a substantial degradation of the paper quality before the protective ink can be leached out. This provides a significant advantage over previously used protective inks which could be leached from a document in 30 minutes or less and without significant degradation of the document.

When exposed to an oxidizing agent, the colorless material in the protective ink changes color to form a conspicuous indication that an alteration attempt has been made. The leach-resistant ink of the present invention has been found to provide a color which persists even after up to 90 hours of soaking.

In order that the invention may be more readily understood, reference is made to the following example, which is intended to illustrate the invention, but is not to be taken as limiting the scope thereof.

EXAMPLE

A leach-resistant ink was prepared by charging the following ingredients to a mixing kettle stirred by a mechanical stirrer; all parts reported are parts by weight. To 62 parts water, 8 parts of Stameg 104 complexing agent (Horizon Chemical Company) was added. This was followed by the addition of 6 parts diphenyl guanidine (Chlorostain BR, Mobay Corporation), 4 parts glacial acetic acid, and 20 parts isopropyl alcohol.

The fixing agent was prepared separately by charging 45 parts water, 35 parts of Mesitol NBS liquid fixing agent (Mobay Corporation), and 20 parts isopropyl alcohol to a stirred mixing kettle. The ink was then printed onto a paper substrate and dried, followed by the coating of the fixing agent onto the substrate.

While certain representative embodiments and details have been shown for purposes of illustrating the invention, it will be apparent to those skilled in the art that various changes in the methods and apparatus disclosed herein may be made without departing from the scope of the invention, which is defined in the appended claims.

What is claimed is:

1. A leach-resistant ink for protecting documents from alteration by oxidizing agents comprising diphenyl guanidine which becomes colored upon contact with an oxidizing agent and a complexing agent selected from the group consisting of glucose, sucrose, sorbitol, methyl glucoside, and mixtures thereof, which forms a complex with said diphenyl guanidine.

2. The leach-resistant ink of claim 1 wherein said complexing agent is methyl glucoside.

3. A document protected against alteration by oxidizing agents comprising a document substrate and a leach-resistant ink printed thereon, said ink comprising a colorless material which becomes colored upon contact with an oxidizing agent, a complexing agent which forms a complex with said colorless material, and a fixing agent which promotes insolubilization and fixing of said complex to said document substrate.

4. The document of claim 3 wherein said colorless material is diphenyl guanidine.

5. The document of claim 3 wherein said complexing agent is selected from the group consisting of glucose, sucrose, sorbitol, methyl glucoside, and mixtures thereof.

6. The document of claim 3 wherein said fixing agent is a mixture of condensation products from aryloxysulfonic acid derivatives.

7. The document of claim 3 wherein said colorless material is diphenyl guanidine, said complexing agent is methyl glucoside, and said fixing agent is a mixture of condensation products from aryloxysulfonic acid derivatives.

8. The document of claim 3 wherein said ink is printed in the form of tamper-indicating indicia.

* * * * *